United States Patent [19]

Koller

[11] Patent Number: 6,060,100

[45] Date of Patent: May 9, 2000

[54] METHOD OF PREPARING PET CHEW PRODUCTS

[76] Inventor: Thomas J. Koller, 5917 Erin Ter., Edina, Minn. 55439

[21] Appl. No.: 09/225,745

[22] Filed: Jan. 5, 1999

[51] Int. Cl.$^7$ .............................. A23L 1/31; A23L 1/312
[52] U.S. Cl. ..................... 426/315; 426/233; 426/443; 426/641; 426/805
[58] Field of Search ..................... 426/315, 233, 426/641, 443, 805

[56] References Cited

U.S. PATENT DOCUMENTS

| | | | |
|---|---|---|---|
| 2,461,291 | 2/1949 | McKee | 99/159 |
| 3,067,043 | 12/1962 | Marsh et al. | 99/208 |
| 3,432,311 | 3/1969 | Aruner | 99/208 |
| 3,716,381 | 2/1973 | Ueno et al. | 99/157 |
| 3,878,307 | 4/1975 | Coleman et al. | 426/266 |
| 3,889,600 | 6/1975 | Sweet | 426/532 |
| 3,966,974 | 6/1976 | Bharucha et al. | 426/265 |
| 3,997,672 | 12/1976 | Stead et al. | 426/59 |
| 4,087,561 | 5/1978 | Bharucha et al. | 426/266 |
| 4,088,793 | 5/1978 | Bharucha et al. | 426/266 |
| 4,218,492 | 8/1980 | Stead et al. | 426/646 |
| 4,239,785 | 12/1980 | Roth | 426/266 |
| 4,277,507 | 7/1981 | Thompson et al. | 426/264 |
| 4,279,935 | 7/1981 | Kentor | 426/264 |
| 4,299,852 | 11/1981 | Ueno et al. | 426/266 |
| 4,305,966 | 12/1981 | Ueno et al. | 426/266 |
| 4,338,345 | 7/1982 | Jadlocki, Jr. et al. | 426/532 |
| 4,344,977 | 8/1982 | Thompson et al. | 426/532 |
| 4,504,515 | 3/1985 | Hohenester et al. | 426/641 |
| 4,559,234 | 12/1985 | Rubin et al. | 426/250 |
| 4,806,372 | 2/1989 | Strumski | 426/129 |
| 4,851,249 | 7/1989 | Hamano | 426/315 |
| 4,868,002 | 9/1989 | Scaglione et al. | 426/641 |
| 4,910,038 | 3/1990 | Ducharme | 426/641 |
| 5,290,584 | 3/1994 | Ray | 426/637 |
| 5,443,852 | 8/1995 | Shahidi et al. | 426/92 |
| 5,731,029 | 3/1998 | Karwowski et al. | 426/646 |

*Primary Examiner*—Chhaya D. Sayala
*Attorney, Agent, or Firm*—Kinney & Lange

[57] ABSTRACT

A pet chew treat made from the gastro-intestinal organs of a bison wherein the gastro-intestinal organs are cleaned of any fat, cut into strips, arranged on a drying rack, smoked in a smokehouse at preferably about 110° F., and then maintained at a temperature of preferably between about 110° F. and about 150° F. until the strips reach about 2% to about 20% moisture. The resulting chew treat is not human food grade and is preserved so that it can be stored at room temperature without a danger of spoilage.

15 Claims, 1 Drawing Sheet

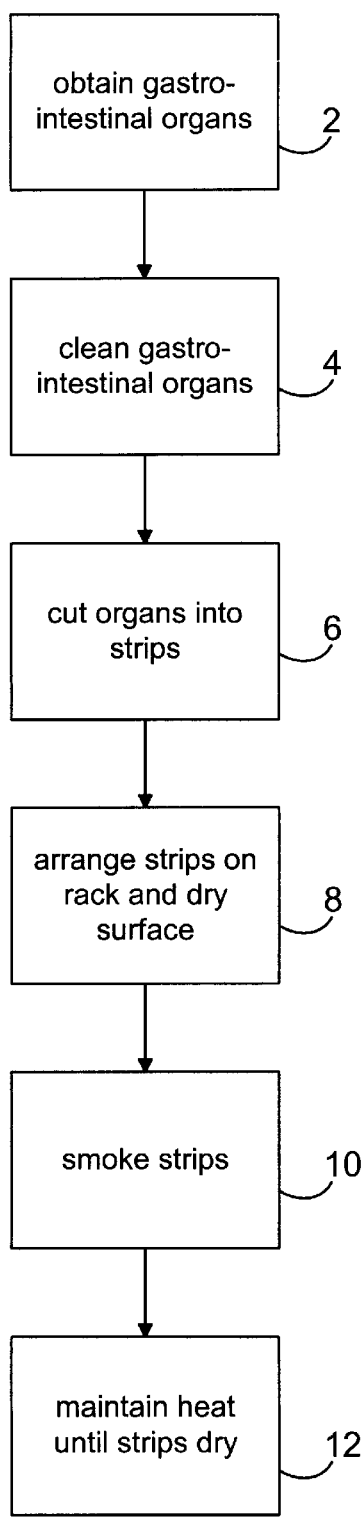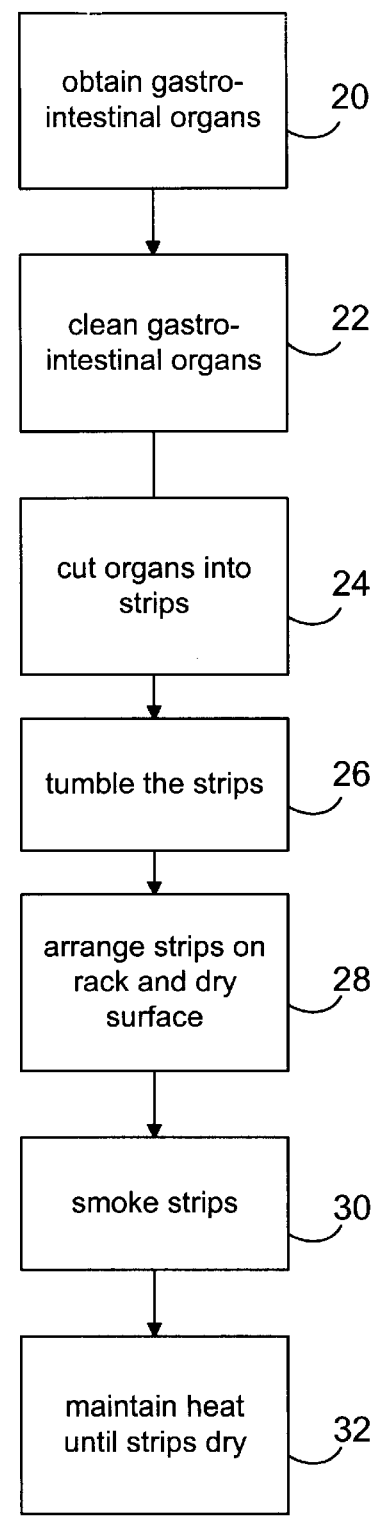
Figure 1
Figure 2

METHOD OF PREPARING PET CHEW PRODUCTS

BACKGROUND OF THE INVENTION

This invention relates to pet chew treats; more specifically, this relates to a method of preparing pet chew treats from the previously unused organs of a harvested large mammal, such as a bison.

Raising bison has become increasingly popular as an alternative agricultural product. The meat produced by a bison is much lower in fat than other commercially available meat, such as that produced by beef cattle or chicken. As with any emerging alternative agricultural product, a major challenge is marketing the product, keeping it priced within the consumer's reach, and still making a profit. Thus, the meat must be priced high enough for the bison rancher to make money, but priced low enough so that the meat is attractive to a broad range of consumers.

One way for bison ranchers to increase their profit margin is to market more than just the bison meat. Just as the Native Americans used every part of the bison, it becomes necessary for modern bison ranchers to utilize as much of the animal as possible. While bison meat is gaining popularity among American consumers, there are parts of the animal that typically are in much less demand. For instance, in the United States there is a much lower demand for the heart, kidneys, stomach, intestines, and other internal organs of the animal. Therefore, finding a marketable use for certain organs of a harvested bison is a need in the art.

Many people in the United States own pets, and more specifically dogs. Dog owners are always searching for treats, rewards, or chew toys that their dogs will enjoy. Several such products exist, however many contain chemicals, preservatives, or are made of rawhide. Much like humans, dogs can develop dietary sensitivities to overly preserved food or treats. Rawhide is particulary bad for a dog's health as it is not digestible. Thus, consumers increasingly demand chew toys or treats that are chemical free, with no preservatives, nitrates, or nitrites and that are not made of rawhide.

BRIEF SUMMARY OF THE INVENTION

The present invention is a method for making pet chew treats from the previously unused organs of a harvested large mammal, such as a bison. The method allows for chew treats to be made without chemicals, preservatives, or rawhide, resulting in the chew treats being more digestible.

The method begins by cleaning the stomach or intestine of the harvested mammal to remove any visible fat. The cleaned stomach or intestine is then cut into strips and dried so that no water remains on the surface. These strips are placed on a rack and the rack is then placed into a smokehouse. The strips are smoked for about two hours between a temperature of 90° F. and about 150° F. After the initial two hours, the smoke is removed but the strips are maintained at a temperature of between about 90° F. and 150° F. for another fourteen hours. Though this time may vary, the intent is for the strips to reach about 2% to about 20% moisture content. Once the strips are dried to about 2% to about 20% moisture content, they can be stored at room temperature.

BRIEF DESCRIPTION OF THE DRAWINGS

FIG. 1 is a flow diagram illustrating the method of preparing pet chew treats.

FIG. 2 is a flow diagram illustrating a method for preparing pet chew treats that have also been flavored.

DETAILED DESCRIPTION

FIG. 1 is a flow diagram of the method of preparing pet chew treats from a harvested bison. The first step 2 is to obtain gastro-intestinal organs from a bison. Gastro-intestinal organs include the stomach, and particularly tripe, and the intestines. Organs from a bison that was not treated with antibiotics or hormones are desired. There is typically a large supply of bison stomachs and intestines because these parts of the animal are typically not used and are in low demand by consumers.

The second step 4 is to clean the gastrointestinal organs by removing any excess fat that may be attached to them. Once cleaned, the third step 6 is to cut the gastrointestinal organs into strips. The strips are typically no wider than two inches and can be any length. A two inch width is desirable because once cooked and dried, the strips will shrink. If the strips begin as two inches wide, they result in a strip roughly the size of a piece of bacon once dried, about one inch (1") to about one and a half inches (1½") wide.

The fourth step 8 is to arrange the strips on a rack. When arranged on the rack, it is important to make sure that the gastrointestinal organ srips are dried and no visible moisture appears on them. If the bison organ strips have been frozen, they must be fully thawed before being placed on the rack. When arranging the bison strips on the rack, it is important to make sure none of these strips touch each other or overlap. If the strips are touching during the drying process, the strips will not color as well from the smoke.

The fifth step 10 is to smoke the bison strips that are now arranged on the rack for about two hours. Smoking the strips turns them a brown color and flavors the strips. It is possible to use a variety of woods to create the smoke; using hard woods, such as maple, oak, or hickory will give the best result. When smoking, the temperature of the smokehouse is kept at between about 90° F. and 150° F. (and preferably between about 110° F. and about 140° F.). The most preferred smoke temperature is about 110° F. because if the temperature during smoking is too high, the strips will experience too much shrinkage. If the temperature is too low, the strips will not cook properly. Smoking for about two hours is desirable because if smoked longer that two hours, the strips become an unacceptably dark color and result in the strips being too dry to the point of being brittle.

The sixth step 12 is to maintain the bison strips at an elevated temperature until they are dried. The heat is maintained for about eleven hours to about sixteen hours at a temperature of between about 90° F. and about 150° F. The preferred range is between about 110° F. and 140° F. The goal is to heat the bison strips for long enough so that they are dried to about 2% to about 20% moisture content. The most preferred moisture content is about 6%. This length of time and range of temperatures assures the strips cook slowly. Cooking the strips too quickly or at too high a temperature may result in the strips becoming unacceptably brittle.

Once dry, the bison strips can be stored at room temperature and need not be refrigerated. The drying process eliminates the possibility of mold growth or other spoilage. The resulting chew treats are not human food grade.

FIG. 2 is a flow diagram of a second embodiment of the present invention. FIG. 2 sets out a method for preparing flavored pet chew treats from bison gastro-intestinal organs. The first step 20 is to obtain gastro-intestinal organs from a bison. The second step 22 is to clean the bison gastrointestinal organs and remove any excess fat. The third step 24 is to cut the gastrointestinal organs into strips. The fourth step 26 is to tumble the bison strips. Tumbling is well known to those skilled in the art, and is used to increase the moisture in the meat product. It is also possible to tumble the bison gastrointestinal organs before cutting them into strips, but tumbling is more effective if done after cutting the stomach or intestine into strips. If the gastrointestinal organs are precut, the amount of moisture absorbed during tumbling is increased due to the increased surface area of the strips.

When tumbling, it is possible to add a cure and additional water to the meat. The cure is either a nitrate or other form of preservative. In addition to a preservative, it is also possible to introduce flavors when tumbling. With the present invention, the bison strips are tumbled for two hours. The amount of cure and water added during tumbling is about 1.5% to about 10% of the weight of the meat. Any variety of flavors may be introduced, including maple, bacon, ham, beef, or chicken.

Once the meat has been tumbled it is possible continue processing much in the same way as the previous embodiment. Thus, the fifth step 28 is to arrange the strips on a rack and ensure that they are dry and thawed out. Next, in the sixth step 30 the strips are placed in a smokehouse and are smoked for about two hours at a temperature of between about 90° F. and about 150° F. After the initial two hours of smoke, the smoke is removed and the strips are maintained at a heat between about 90° F. and about 150° F. for other about eleven to about sixteen hours in the seventh step 32. The strips are maintained at this heat until they reach about 2% to about 20% moisture. Once dry, the strips can be stored at room temperature.

The intention of this method is to dry the bison gastrointestinal organs to such a point that they will not rot or grow mold, but yet will not become brittle and still remain chewy. Once at this level of dryness, the strips will not need to be refrigerated or frozen. Though the present embodiment discloses using a smoke-house to dry the bison strips, achieving the desired level of moisture in the strips can be achieved in a variety of ways. Thus, once smoked it may be possible to continue drying through the use of a convention oven rather than the smokehouse. Furthermore, though the present invention has been described using bison stomach and intestine, it is also possible to create pet chew treats with the present invention from the gastrointestinal organs of other large mammals, particularly from other large ruminants such as beef cattle, deer, venison, or elk.

Although the present invention has been described with reference to preferred embodiments, workers skilled in the art will recognize that changes may be made in form and detail without departing from the spirit and scope of the invention.

What is claimed is:

1. A method for preparing pet chew treats, the method comprising:

cleaning a gastrointestinal organ from a large mammal and removing any excess fat;

cutting the gastrointestinal organ into strips; and drying the strips until the strips reach between about 2% and about 20% moisture content.

2. The method of claim 1 wherein drying the strips comprises:

arranging the strips on a rack;

smoking the strips at between about 90° F. and about 150° F. for about two hours; and maintaining the strips at between about 90° F. and about 150° F. for between about eleven hours and about sixteen hours.

3. The method of claim 2 wherein maintaining the strips is at a temperature of between about 110° F. and about 140° F. for between about eleven hours and about sixteen hours.

4. The method of claim 2 wherein smoking the strips is at about 10° F. for about two hours.

5. The method of claim 1 wherein the strips are dried until the strips reach about 6% moisture content.

6. The method of claim 1 and further comprising tumbling the strips.

7. The method of claim 1 wherein the large mammal is a bison.

8. The method of claim 7 wherein the organ is a stomach.

9. A pet chew treat, the chew treat comprising a strip cut from a gastrointestinal organ of a large mammal and dried until the strip reaches between about 2% and about 20% moisture content.

10. The pet chew treat of claim 9 wherein the chew treat is not human food grade.

11. The pet chew treat of claim 9 wherein the chew treat is storable at room temperature.

12. The pet chew treat of claim 9 wherein the gastrointestinal organ is from a bison.

13. A pet chew treat, the chew treat comprising a gastrointestinal organ from a bison which has been cleaned to remove any excess fat, cut into strips, smoked for about two hours at between about 90° F. and 150° F., and maintained at a temperature between about 90° F. and about 150° F. for between about eleven and about sixteen hours.

14. The pet chew treat of claim 13 wherein the pet chew treat is not human food grade.

15. The pet chew treat of claim 13 wherein the pet chew treat is storable at room temperature.

\* \* \* \* \*

UNITED STATES PATENT AND TRADEMARK OFFICE
CERTIFICATE OF CORRECTION

PATENT NO. : 6,060,100
DATED : MAY 9, 2000
INVENTOR(S) : THOMAS J. KOLLER

It is certified that error appears in the above-indentified patent and that said Letters Patent is hereby corrected as shown below:

Col. 4, line 21, delete "10°F", insert --100°F--

Signed and Sealed this

Tenth Day of April, 2001

Attest:

NICHOLAS P. GODICI

Attesting Officer     Acting Director of the United States Patent and Trademark Office